United States Patent
Disselhorst

(10) Patent No.: US 8,545,726 B2
(45) Date of Patent: Oct. 1, 2013

(54) BURNER FOR THE GASIFICATION OF A SOLID FUEL

(75) Inventor: Johannes Hermanus Maria Disselhorst, Amsterdam (NL)

(73) Assignee: Shell Oil Company, Houston, TX (US)

(*) Notice: Subject to any disclaimer, the term of this patent is extended or adjusted under 35 U.S.C. 154(b) by 0 days.

(21) Appl. No.: 13/437,579

(22) Filed: Apr. 2, 2012

(65) Prior Publication Data

US 2013/0087743 A1     Apr. 11, 2013

Related U.S. Application Data

(63) Continuation-in-part of application No. PCT/EP2011/066671, filed on Sep. 26, 2011.

(51) Int. Cl.
 *F23D 1/00*     (2006.01)
 *C01B 3/02*     (2006.01)

(52) U.S. Cl.
 USPC .......................................... 252/373; 431/354

(58) Field of Classification Search
 None
 See application file for complete search history.

(56) References Cited

FOREIGN PATENT DOCUMENTS

| | | |
|---|---|---|
| CN | 101363622 A | 2/2009 |
| CN | 101363624 A | 2/2009 |
| EP | 0108427 A1 | 5/1984 |
| EP | 0129921 A2 | 1/1985 |
| EP | 0 130 630 A2 * | 9/1985 |
| EP | 0328794 A1 | 8/1989 |
| EP | 0367966 A1 | 5/1990 |
| JP | 2000026870 A | 1/2000 |

* cited by examiner

*Primary Examiner* — Melvin C Mayes
*Assistant Examiner* — Douglas Call

(57) ABSTRACT

A burner includes a burner front having annular and central openings. The annular opening, for discharging a solid fuel, fluidly connects to a central passage way. The central opening, for discharging an oxygen containing gas, fluidly connects to an annular passage way for passage of oxygen positioned co-axial with the central passage way. The central passage way has a downstream part and a diameter that increases over a first length and subsequently decreases over a second length terminating at the burner front. Inside the downstream part a hollow member is positioned which is closed at one end and has an opening at or near the burner front, and has increasing and decreasing diameters aligned with the increasing and decreasing diameters of the central passage way forming an annular passage. The hollow member fluidly connects with the annular passage way for the oxygen containing gas via one or more connecting conduits.

9 Claims, 2 Drawing Sheets

BURNER FOR THE GASIFICATION OF A SOLID FUEL

CROSS-REFERENCE TO RELATED APPLICATION

This application is a continuation in part of co-pending PCT/EP2011/066671, filed Sep. 26, 2011. PCT/EP2011/066671 is hereby incorporated by reference in its entirety.

FIELD OF THE INVENTION

The invention is directed to a burner for the gasification of a solid fuel. The burner is particularly suitable for use in the gasification of carbonaceous fuels, such as finely divided solid fuel carried by a gas carrier, e.g., pulverized coal carried by a gas carrier such as nitrogen gas and/or carbon dioxide, using an oxygen-containing gas, e.g., for producing pressurized synthesis gas, fuel gas or reducing gas.

BACKGROUND OF THE INVENTION

Gasification of a solid carbonaceous fuel is obtained by the reaction of the fuel with oxygen. The fuel mainly contains carbon and hydrogen as combustible components. The gas-carried finely divided carbonaceous fuel and the oxygen-containing gas are passed via the separate channels in the burner into a reactor at relatively high velocity. In the reactor a flame is maintained in which the fuel reacts with the oxygen in the oxygen-containing gas at temperatures above 1300° C. to form mainly carbon monoxide and hydrogen.

Various burner designs have been proposed in the prior art. EP-A-328794 describes a burner wherein finely divided coal is supplied to a burner front via a central channel disposed along the longitudinal axis of the burner, and oxygen-containing gas is supplied via at least one annular channel surrounding said central channel. The oxygen is directed into the flow of coal at the burner front.

EP-A-130630 describes a burner wherein at the burner front, an oxygen containing gas is discharged from a central channel at high velocity and an oxygen containing gas is discharged from an annular outlet at a lower velocity. A solid fuel is discharged from a number of outflow openings located between said central and annular oxygen outlet openings. According to this publication, the outer low velocity oxygen stream serves to protect the burner against overheating due to suction of hot gasses. The publication discloses that if the burner is used for large throughputs, the outlet openings for the solid fuel are preferably not of an annular shape. It is stated that such a design would not result in a proper contact of all the solid fuel particles with oxygen.

The burner type according to EP-A-328794 has been used commercially with great success. However, at high throughputs the heat-flux to the burner front increases to such values that burner lifetimes may become too short.

EP-A-130630 addresses the issue of heat flux to the burner front by applying a low velocity oxygen shield around the flame. A disadvantage of the burner according to EP-A-130630 is that for high throughputs, the solid fuel is passed through separate channels to the burner front, which may cause erosion problems. Another problem is the complexity of the design due to the fact that one metal piece with multiple channels for solid fuel and oxygen containing gas needs to be manufactured. Moreover, the heat flux to the burner front can still be very high due to synthesis gas/oxygen flame.

SUMMARY OF THE INVENTION

The following burner aims at providing a burner which can be used for high throughputs and which does not have the disadvantages of the prior art burners:

a burner for the gasification of a solid fuel, comprising a burner front having an opening for discharging a solid fuel and one or more openings for discharging an oxygen containing gas, wherein the opening for discharging the solid fuel is fluidly connected to a central passage way and wherein the opening for discharging the oxygen containing gas is fluidly connected to an annular passage way for passage of oxygen; and wherein the central passage way has a downstream part wherein the diameter of the passage way increases over a first length and subsequently decreases over a second length terminating at the burner front and wherein inside the downstream part of the central passage way, a hollow member is positioned that is closed at one end and has an opening at the burner front, the hollow member having an increasing diameter and decreasing diameter aligned with the increasing and decreasing diameter of the central passage way to form an annular passage for the solid fuel terminating at burner front in a inwardly directed annular opening for discharging the solid fuel; and wherein the hollow member is fluidly connected with the annular passage way for the oxygen containing gas by means of one or more connecting conduits and wherein the opening of the hollow member forms at least a part of the opening for discharging the oxygen containing gas.

The invention is also directed to a process to prepare a mixture comprising hydrogen and carbon monoxide by means of gasification of a solid fuel using a burner as above, wherein an oxygen containing gas is passed through the passageway for oxygen containing gas, a solid fuel and a carrier gas are passed through a central passage and gasification takes place at the burner front.

DETAILED DESCRIPTION OF THE INVENTION

Figure 1:
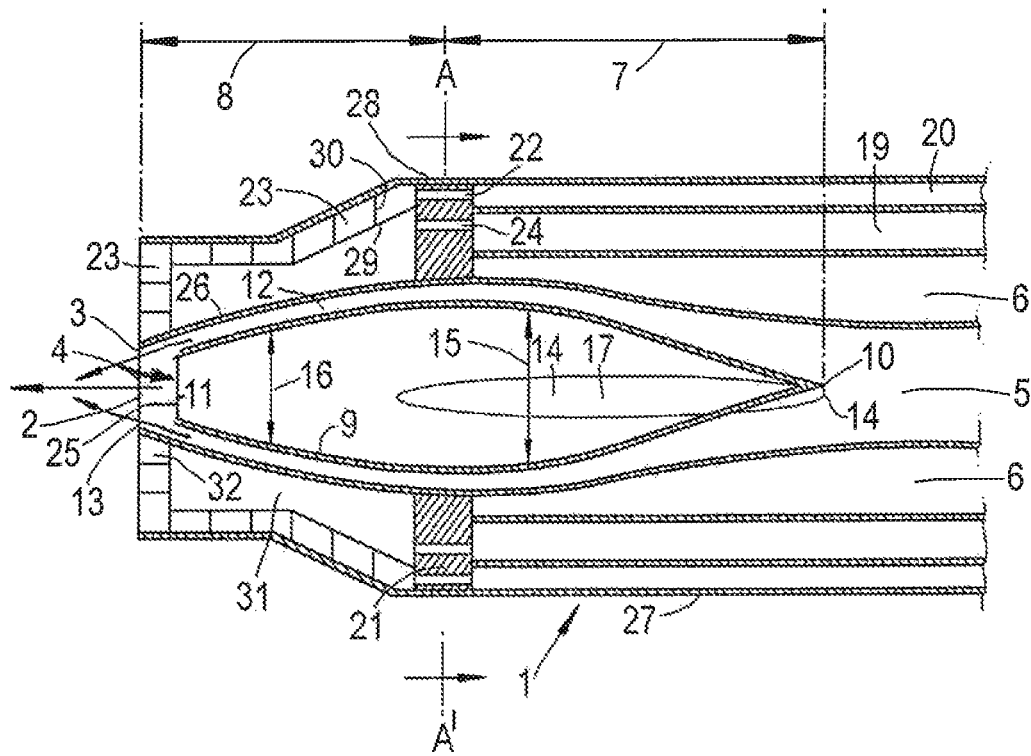
FIG. 1 shows a longitudinal section of the front part of a first exemplary embodiment of a burner.

Applicants found that in contrast to the teachings of EP-A-130630, a burner can be provided for high throughput operation which has an annular opening for the solid fuel. By directing all the oxygen through the one or more openings for oxygen containing gas, a sufficient contact with the solid fuel is achieved. Detailed computer simulations predict that the flame will be somewhat lifted from the burner front. This greatly decreases the heat flux to the burner front and thereby extends the lifetime of said burner front and the lifetime of the rim separating the annular passage for the solid fuel and the one or more openings for discharging the oxygen containing gas.

The burner according to the invention does not have the outer annular outlet for discharging an oxygen containing gas at a lower velocity as in the burner according to EP-A-130630. Because of the alignment in dimensions of the hollow member and the central passageway a flow path for the solid fuel results, which limits erosion.

The term 'oxygen-containing gas' as used herein is intended to refer to gas containing free oxygen, $O_2$, and to include air, oxygen-enriched air (i.e., more than 21 mole % oxygen) and also substantially pure oxygen (i.e., more than about 95 mole % oxygen), with the remainder comprising gases normally found in air such as nitrogen, and/or rare gases.

The term 'solid carbonaceous fuel' as used herein is intended to include various, gas carried, combustible materials and mixtures thereof from the group of coal, coke from coal, coal liquefaction residues, petroleum coke, soot, biomass, and particulate solids derived from oil shale, tar sands and pitch. The coal may be of any type, including lignite, sub-bituminous, bituminous and anthracite. The solid carbonaceous fuels are preferably ground to a particle size so that at least about 90% by weight of the material is less than 90 microns and moisture content is less than about five per cent by weight. The solid fuel is supplied to the burner in admixture with a carrier gas, preferably nitrogen or carbon dioxide.

The term high capacity burner as used herein is intended to include a process wherein more than 3 kg/sec of solids is discharged from the annular opening. The width of the annular opening of such a high capacity burner is preferably more than 4 mm. The preferred velocity of solids as it is discharged from the annular opening is between 5 and 15 m/s.

The outlet can be a single central opening at the burner front or can be configured differently, e.g., being arranged at a distance upstream of the burner front. With non-vertical burners, in particular with horizontal burners, such a retracted outlet reduces the risk of blockage by slag flowing down from the burner front.

In a further specific embodiment, the outlet may comprise a plurality of openings, which can for instance be coaxial. Such an arrangement may for example include a central opening at the end of a low velocity conduit, and an annular opening at the end of a high velocity conduit, the annular opening being surrounded by the inwardly directed annular opening for discharging the solid fuel. In such an arrangement, mixing of oxygen and fuel is completed at a substantially shorter distance from the burner front. Optionally, the center of the central conduit can be offset from the center of the annular conduit, e.g., the central conduit may be offset downwardly relative to the center of the annular channel. With horizontal burners, this compensates for the effect of gravity on the uniformity of the solid fuel outflow. With such a burner arrangement the central opening may for example discharge oxygen containing gas with a velocity of between 10 and 30 m/s, while the annular opening around the central opening discharges oxygen containing gas with a velocity of between 30 and 100 m/s, and the fuel discharged from the annular opening is discharged at a velocity of between 5 and 15 m/s.

In a further specific embodiment, the outlet may comprise one or more openings with a center point at a distance from a center point of the fuel discharge opening. More particularly, the outlet may be at a distance below the center point of the fuel discharge opening. With horizontal burners, this compensates for the effect of gravity on the uniformity of the fuel outflow.

The burner is particularly suitable for carrying out a process to prepare a mixture of hydrogen and carbon monoxide by means of gasification of a solid fuel, wherein an oxygen containing gas is passed through the passageway, a solid fuel and a carrier gas is passed through the central passage and gasification takes place at the burner front.

DETAILED DESCRIPTION OF THE FIGURES

FIG. 1 shows a longitudinal section of the front part of a burner (1). Burner (1) has a burner front (2) having an opening (3) for discharging a solid fuel and a single central opening (4) for discharging an oxygen containing gas. The opening (3) for discharging the solid fuel is fluidly connected to a central passage way (5). A passageway (6) is positioned co-axially with the central passage way (5).

Central passage way (5) has a downstream part wherein the diameter of the passage way (5) increases over a first length (7) and subsequently decreases over a second length (8) terminating at the burner front (2). Inside the downstream part (6) of the central passage way a hollow member (9) is positioned which is closed at one end (10) and has an opening (11) at a distance upstream from the burner front (2). The hollow member (9) has an increasing diameter and decreasing diameter aligned with the increasing and decreasing diameter of the central passage way (5) to form an annular passage (12) for the solid fuel terminating at burner front (2) in an inwardly directed annular opening (13) for discharging the solid fuel. The alignment in diameter can be chosen such that flow direction changes only gradually to limit erosion.

The hollow member (9) preferably has an internal increasing diameter (15) and internal decreasing diameter (16) aligned with the increasing and decreasing diameter of the hollow member (9). This defines a hollow space in the hollow member having a conical shaped part and a frusto-conical shaped part. The hollow member (9) is fluidly connected with the annular passage way (6) for the oxygen containing gas by means of one or more connecting conduits (14). The connecting conduits (14) are also the spacers which keep hollow member (9) positioned within the central passageway (5). The design of conduits (14) may be such that, when in use, a swirl is imparted to either the flow of solids or to the oxygen containing gas or to both. In the shown exemplary embodiment, the connecting conduits (14) have a discharge opening (17) positioned in the diverging part, said otherwise in the conical part, of the hollow member (9) having diameter (15). Discharge openings (17) suitably have an ellipsoidal form, wherein the longer dimension is aligned with the axis of the burner. In the shown embodiment the number of openings (14) is 3. Less or more openings (14) can also be used, if so desired.

FIG. 1 also shows opening (11) of the hollow member at its frusto-conical shaped end, which opening is the opening (4) for discharging the oxygen containing gas at the burner front (2). The opening (4) for discharging the oxygen containing gas is thus fluidly connected to annular passage way (6) for passage of the oxygen containing gas via hollow member (9) and connecting conduits (14).

The downstream end of the hollow member (9) forms a rim (25) bordering the opening (4). The rim (25) and the opening (4) are at a distance upstream of the burner front (2). This reduces the risk of blockage by liquid slag flowing down from the burner front (2), particularly in case the burner is not vertical, e.g., horizontal, and reduces heat flux towards the rim (25), e.g., after a burner shut-down.

The dimensions and shape of the hollow member (9) can be chosen such that the oxygen containing gas is discharged from its opening (11) in an evenly distributed flow. Preferably the velocity of the oxygen containing gas as it is discharged from this opening is between 30 and 90 m/s. The shape of the hollow member comprises a conical end and a frusto-conical end pointing towards the burner front (2), wherein both parts are directly connected or optionally via a tubular part. The angle made by the slopes of the top of the conical end (10) is preferably between 5 and 35 degrees. This angle should preferably not be too large in order to limit erosion at the point where the flow of solids is debouched from the central passage way (5) to the annular passage way (12). The shape of the frusto-conical part is preferably so chosen that the angle between the resulting outflow direction of the inwardly directed annular opening (13) for discharging the solid fuel and the axis of the burner (1) is between 5 and 35 degrees.

Preferably the width of rim (25) of the hollow member (9) separating the opening (3) for discharging a solid fuel from the opening (4) for discharging an oxygen containing gas is between 0.5 and 3 mm. The angle as formed by the outflow direction of the inwardly directed annular opening (13) for discharging the solid fuel and the axis of the burner (1) is preferably between 5 and 35 degrees. It has been found that within this range an optimal contact between the oxygen containing gas and fuel is achieved while also achieving sufficient lifting of the flame and thus reduction of the heat flux.

The burner of FIG. 1 also has a preferred annular passage way (19) for coolant positioned around the annular passage way (6). Around passage way (19) an annular passage way (20) is present for return coolant. Suitably passageways (6), (19) and (20) terminate at a connection block (21) provided with a central opening for the central passage way (5), multiple openings (24) for passage of fresh coolant from passage way (19) to a cooling jacket (23) and multiple openings (22) for passage of used coolant from cooling jacket (23) to passageway (20). The presence of connecting block (21) is advantageous because it enables one to simply replace a possibly damaged hollow member (9). The frusto-conical part of the hollow member can be removed by cutting away the cooling jacket (23) and the frusto-conical wall part (26) of the central passage way (5) from connection block (21). The connection block (21) is suitably located at the point where the diameter of the central passage way (5) inverses from an increasing diameter to a decreasing diameter in order to allow simple removal as herein described.

Cooling jacket (23) is preferably a cooling jacket as described in the aforementioned EP-A-328794 or as described in CN-A-101363624. Such a cooling jacket (23) has double walls (28, 29) defining the exterior of the burner section starting at the connection block (21) and terminating at the burner front (2). The double walls (28, 29) are spaced by one or more baffles (30) defining a flow path for coolant encircling said burner section and part of the burner front (2). The coolant enters the burner front (2) via opening (32) from a coolant compartment (31) defined by wall (29) and wall (26) of the central passage way (5). Coolant compartment (31) is fluidly connected to passageway (19) via openings (24).

The end of burner (1) having the supply connections for oxygen containing gas, solid fuel, fresh and used coolant is not shown in FIG. 1. A design as described in CN-A-101363622 may be suitably used for this purpose.

Figure 2:
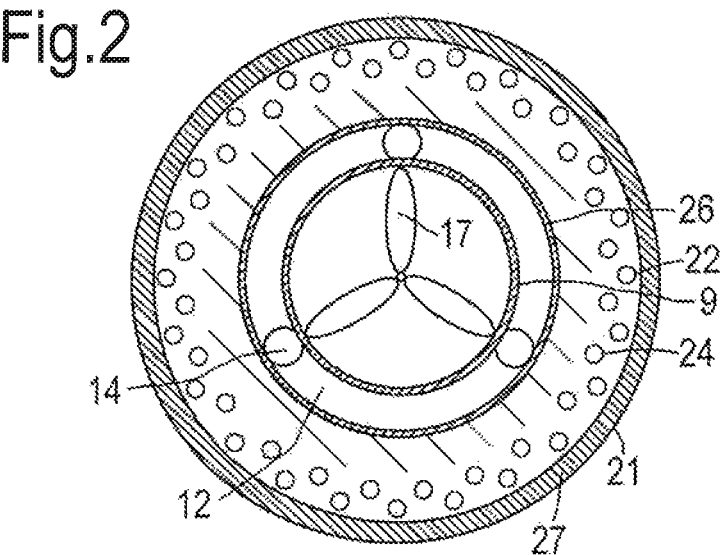
FIG. 2 shows a cross-sectional section AA' of the burner of FIG. 1.

The references used in FIG. 2 have the same meaning as described above. In addition FIG. 2 shows the outer wall (27) of the annular passage way (20). FIG. 2 shows an embodiment having three openings (17). In FIG. 1 only one connecting conduit (14) and one opening (17) of the three openings is shown for clarity reasons.

Figure 3:
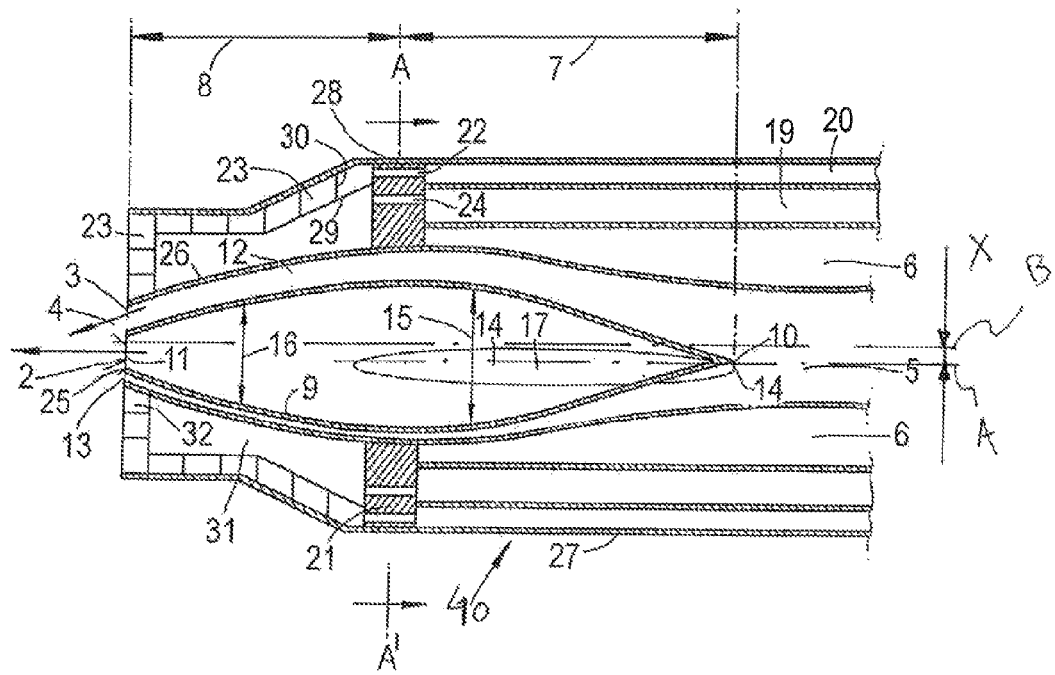
FIG. 3 shows a longitudinal section of the front part of a second exemplary embodiment of a burner.

FIG. 3 shows a horizontally arranged burner (40) which is to a large extent the same as the burner (1) of the FIG. 1. The references used in FIG. 3 have the same meaning as described above. The main difference with the burner (1) of FIG. 1 is that the hollow member has a longitudinal axis A at a distance X below the longitudinal axis B of the central passage way (5). As a result the radial width of the annular passage (12) is larger at the upper side than at the lower side, so the volumetric outflow will be larger at the top side of the annular fuel outlet opening (13). This compensates for the fact that coal density in the upper part of the fuel outlet (13) is lower than the coal density at the lower part of fuel outlet (13).

In the embodiment of FIG. 3, the rim (25) and the opening (4) are at the burner front (2). In an alternative embodiment, the rim (25) and the opening (4) may be at a distance upstream of the burner front (2), similar to the embodiment of FIG. 1.

Figure 4:
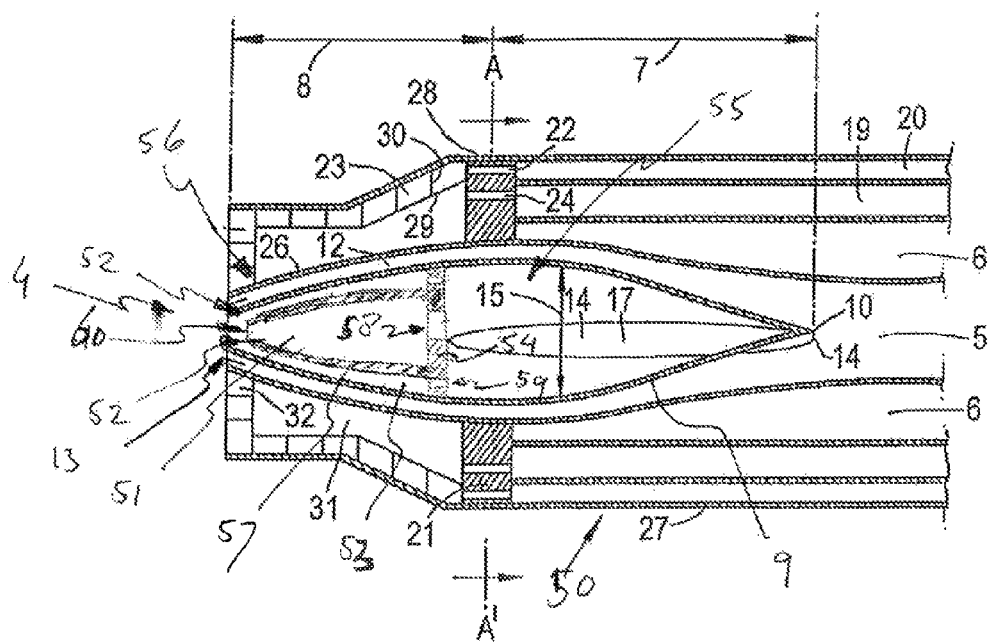
FIG. 4 shows a longitudinal section of the front part of a third exemplary embodiment of a burner.

FIG. 4 shows a horizontal burner (50) which is to a large extent the same as the burner (1) of the FIG. 1 and the burner (40) of FIG. 3. The references used in FIG. 4 have the same meaning as described above. In the embodiment of FIG. 4, the outlet (4) comprises a plurality of coaxial openings, including a central opening (60) at the downstream end of a low velocity conduit (51), and an inwardly directed annular opening (52) at the downstream end of a high velocity conduit (53). The annular opening (52) is surrounded by the inwardly directed annular opening (13) for discharging the solid fuel. A second vertical connecting block (54) divides the interior of the hollow member (9) into an upstream side (55) and a downstream side (56). A substantially frusto-conical wall (57) extends from the second connection block to the opening (4). The frusto-conical wall (57) runs substantially parallel to the wall of the hollow member (9).

The second connecting block (54) is provided with a central opening (58) providing an open connection between the interior of the frusto-conical wall (57) and the central passage way (5). This way the interior of the frusto-conical wall (57) defines the first oxygen supply conduit (51).

The second connecting block (54) is also provided with a circular array of openings (59) providing an open connection between the central passage way (5) and the downstream annular space between the frusto-conical wall (57) and the hollow member (9). This annular space defines the second oxygen supply conduit (52). The dimensions of the hollow member (9), the frusto-conical wall (57) and the openings (58, 59) in the second connecting block (54) are dimensioned to obtain a high velocity oxygen flow in the annular conduit (53) and a low velocity oxygen flow in the central conduit (51). This reduces the distance between the burner front (2) and the downstream point where mixing between oxygen and fuel is complete.

In the embodiment of FIG. 4 the longitudinal axis of the frusto-conical wall substantially coincides with the longitudinal axis of the hollow member (9) and the burner (50). In an alternative embodiment, the longitudinal axis of the frusto-conical wall (57) may be offset from the longitudinal axis of the hollow member (9) and/or offset from the longitudinal axis of the burner (50). Particularly with non-vertical, e.g. horizontal burners, a downwardly offset arrangement of the frusto-conical wall (57) can contribute to compensating non-uniformity of the density distribution in the annular passageway (52).

The invention claimed is:

1. A burner for the gasification of a solid fuel, comprising a burner front having an opening for discharging a solid fuel, the burner comprising an outlet at or upstream of the burner front based upon the direction of fluid flow for discharging an oxygen containing gas, wherein the opening for discharging the solid fuel is fluidly connected to a central passage way and wherein the outlet for discharging the oxygen containing gas is fluidly connected to an annular passage way for passage of oxygen and wherein the central passage way has a downstream part wherein the diameter of the passage way increases over a first length and subsequently decreases over a second length terminating at the burner front and wherein inside the downstream part of the central passage way a hollow member is positioned which is closed at one end and has an opening at or upstream of the burner front based upon the direction of fluid flow, the hollow member having an increasing diameter and decreasing diameter aligned with the increasing and decreasing diameter of the central passage way to form an annular passage for the solid fuel terminating at the burner front in an inwardly directed annular opening for discharging the solid fuel and wherein the hollow member is fluidly connected with the annular passage way for the oxygen containing gas by means of one or more connecting conduits, wherein the outlet is not a single central opening at the burner front.

2. The burner according to claim 1, wherein the outlet is upstream of the burner front.

3. The burner according to claim 1 wherein the outlet comprises a plurality of openings.

4. The burner according to claim 3 wherein the openings of the outlet are coaxial.

5. The burner according to claim 4 wherein the openings of the outlet comprise a central opening at the end of a low velocity conduit, and an annular opening at the end of a high velocity conduit, the annular opening being surrounded by the inwardly directed annular opening for discharging the solid fuel.

6. The burner according to claim 1 wherein the outlet comprises one or more openings with a center point at a distance from a center point of the fuel discharge opening in front view.

7. The burner according to claim 6 comprising a longitudinal central axis under an angle with the vertical, and wherein the center point of the one or more openings of the outlet are at a distance below the center point of the fuel discharge opening.

8. A process to prepare a mixture of hydrogen and carbon monoxide by means of gasification of a solid fuel using a burner according to claim 1, wherein an oxygen containing gas is passed through passageway, a solid fuel and a carrier gas is passed through central passage and gasification takes place downstream of the outlet and the fuel discharge opening.

9. The process according to claim 8, wherein the outlet comprises a central opening discharging oxygen containing gas with a velocity of between 10 and 30 m/s, and an annular opening around the central opening discharging oxygen containing gas as with a velocity of between 30 and 100 m/s, while the fuel discharged from the annular opening is at a velocity of between 5 and 15 m/s, the annular fuel discharge opening surrounding the annular oxygen discharge opening.

* * * * *